US011902804B2

(12) United States Patent
Viswambharan et al.

(10) Patent No.: US 11,902,804 B2
(45) Date of Patent: Feb. 13, 2024

(54) FAULT TRIAGE AND MANAGEMENT WITH RESTRICTED THIRD-PARTY ACCESS TO A TENANT NETWORK

(71) Applicant: Cisco Technology, Inc., San Jose, CA (US)

(72) Inventors: Rajesh Indira Viswambharan, Karnataka (IN); Saravanan Radhakrishnan, Tamilnadu (IN); Girish Thimmalapura Shivanna, Karnataka (IN); Mahaveer Jain, Karnataka (IN); Rishi Kant, Bihar (IN); Sarthak Udai Singh, Uttar Pradesh (IN)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 17/568,562

(22) Filed: Jan. 4, 2022

(65) Prior Publication Data
US 2023/0217273 A1 Jul. 6, 2023

(51) Int. Cl.
*H04W 24/04* (2009.01)
*H04W 12/06* (2021.01)
(Continued)

(52) U.S. Cl.
CPC ......... *H04W 24/04* (2013.01); *H04L 41/0677* (2013.01); *H04W 12/06* (2013.01); *H04W 12/61* (2021.01); *H04W 48/02* (2013.01)

(58) Field of Classification Search
CPC ..... H04W 24/04; H04W 12/06; H04W 12/61; H04W 48/02; H04W 12/08; H04W 12/03; H04L 41/069; H04L 41/28
See application file for complete search history.

(56) References Cited

U.S. PATENT DOCUMENTS 10,298,589 B2 * 5/2019 Cleaver ................ H04L 63/102
2010/0197238 A1 * 8/2010 Pathuri ............... H04L 41/0609
455/67.11
(Continued)

FOREIGN PATENT DOCUMENTS

WO 2020192938 10/2020

OTHER PUBLICATIONS

"A Refined RBAC Model for Cloud Computing"; Li et al.; 2012 IEEE/ACIS 11th International Conference on Computer and Information Science (Year: 2012).*
(Continued)

*Primary Examiner* — Benjamin H Elliott, IV
(74) *Attorney, Agent, or Firm* — Polsinelli P.C.

(57) ABSTRACT

The present technology is directed to providing fault management with dynamic restricted access in a tenant network. The tenant network can be a private 5G cellular network or other wireless communication network. The present technology can identify a fault event within the tenant network based on received telemetry data, associate the fault event with a vendor component included in the tenant network, and generate a vendor fault context. The vendor fault context can be generated to include only the portion of telemetry data that is determined to be related to the fault event or the vendor component. The present technology can further use the vendor fault context to create a time-bound user account for remotely accessing the tenant network for fault triage and management. The time-bound user account can be associated to a static role-based access control (RBAC) scheme configured with access restrictions determined based on the vendor fault context.

20 Claims, 3 Drawing Sheets

(51) Int. Cl.
*H04W 12/61* (2021.01)
*H04L 41/0677* (2022.01)
*H04W 48/02* (2009.01)

(56) References Cited

U.S. PATENT DOCUMENTS

| | | | | |
|---|---|---|---|---|
| 2012/0096279 | A1* | 4/2012 | Roberts | H04L 63/083 |
| | | | | 713/184 |
| 2016/0073290 | A1* | 3/2016 | Kakadia | H04L 43/08 |
| | | | | 370/242 |
| 2016/0112429 | A1* | 4/2016 | Sundaresan | H04L 63/08 |
| | | | | 726/4 |
| 2016/0182487 | A1* | 6/2016 | Zhu | H04L 63/083 |
| | | | | 726/9 |
| 2017/0149491 | A1* | 5/2017 | Williams | H04B 7/185 |
| 2017/0213303 | A1* | 7/2017 | Papadopoulos | G06F 16/248 |
| 2018/0324671 | A1* | 11/2018 | Palnati | H04L 12/1407 |
| 2019/0098012 | A1* | 3/2019 | Dong | G06F 21/6245 |
| 2019/0265971 | A1* | 8/2019 | Behzadi | H04L 67/61 |
| 2019/0356535 | A1* | 11/2019 | Li | H04L 41/0631 |
| 2021/0176823 | A1* | 6/2021 | Mishra | H04W 88/16 |
| 2021/0303381 | A1* | 9/2021 | Baldassarre | G06F 11/008 |
| 2021/0306899 | A1* | 9/2021 | Mishra | H04W 28/0983 |
| 2023/0169156 | A1* | 6/2023 | Mozano | G06F 21/316 |
| | | | | 726/4 |
| 2023/0217273 | A1* | 7/2023 | Viswambharan | H04L 41/0677 |
| | | | | 370/242 |

OTHER PUBLICATIONS

"Fault Management in Software-Defined Networking: A Survey"; Yu et al.; IEEE Communications Surveys & Tutorials, vol. 21, No. 1, First Quarter 2019 (Year: 2019).*

"Scalable and Effective Test Generation for Role-Based Access Control Systems"; Masood et al.; IEEE Transactions on Software Engineering, vol. 35, No. 5, Sep./Oct. 2009 (Year: 2009).*

"Protecting Smart Grid Automation Systems Against Cyberattacks"; Wei et al.; IEEE Transactions on Smart Grid, vol. 2, No. 4, Dec. 2011 (Year: 2011).*

* cited by examiner

FAULT TRIAGE AND MANAGEMENT WITH RESTRICTED THIRD-PARTY ACCESS TO A TENANT NETWORK

TECHNICAL FIELD

The present technology pertains to wireless networks, and more particularly to providing restricted access to a tenant network environment for fault triage and management.

BACKGROUND

Private 5G networks have been proposed for enterprise use cases, for example under a 5G-as-a-service model. In this model, private 5G networks are typically built using 5G functional elements and management services that are obtained from multiple different vendors. This can be especially true with respect to the RAN (Radio Access Network) portion of private 5G deployments. The 5G functional elements and management services can also be provided across a combination of cloud and on-premises locations.

Flexible hardware and software implementations can allow scalable, cost-effective network deployments—but only if hardware and software components are interoperable and can be mixed and matched from different vendors. A split architecture (between central and distributed units) allows for coordination for performance features, load management, real-time performance optimization and enables adaptation to various use cases and the QoS that needs to be supported (e.g., gaming, voice, video), which have variable latency tolerance and dependency on transport and deployment scenarios. Due to the complexity of integrating multiple components that are provided by different third-party vendors and across various locations, cloud-based management has emerged as one approach for managing private 5G network deployments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
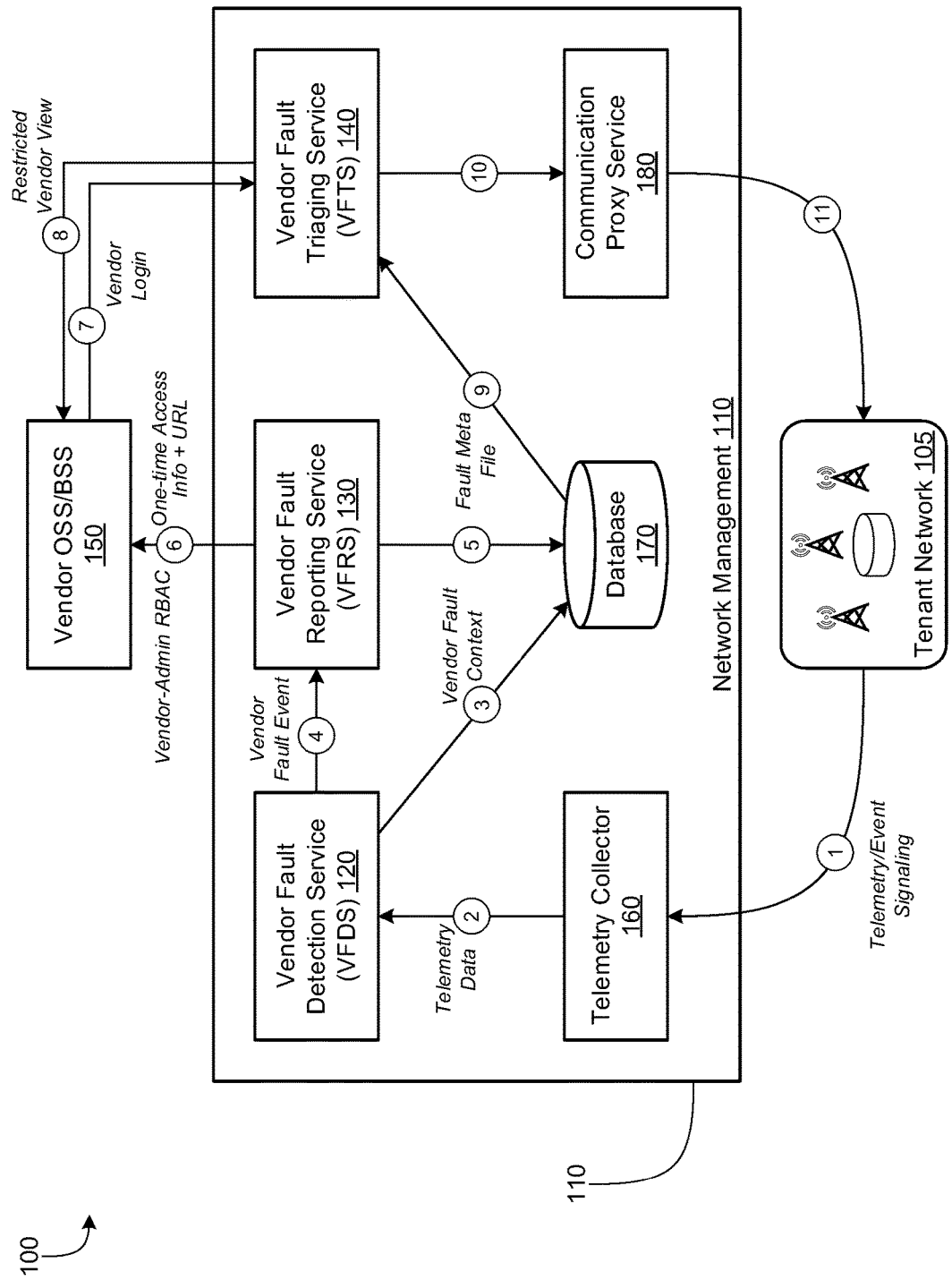
FIG. 1 illustrates an example fault management system for dynamically providing restricted network access for fault management, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Designing, planning and managing a private 5G network can be difficult due the increasing usage of 5G functional elements and/or management services that are obtained from multiple different vendors. This can be especially true with respect to the RAN (Radio Access Network) portion of a 5G network deployment. Management challenges and issues can arise from the fact that most, if not all, of the vendors participating in a given private 5G network are third parties that should not be given full access to the network. In addition to being obtained from multiple different third-party vendors, in some cases, challenges and issues may arise from the fact that the 5G functional elements and management services can be located across different cloud locations and/or physical on-premises locations.

Existing management approaches for managing private 5G network deployments have not addressed these management challenges and issues. For example, when an enterprise customer (or other private 5G network operator) encounters a problem or experiences an issue with their private 5G network, there is no adequate solution for automatically and efficiently identifying the specific vendor component that triggered the fault. In some cases, this may be due to the increased complexity and interconnectivity of 5G networks (e.g., an anomaly in system A is not necessarily indicative that the anomaly originated in system A). Furthermore, one the third-party vendor responsible for the network issue has been identified, there is no adequate solution to allow the third-party vendor to securely but automatically access the relevant portion(s) of the network in order to triage and remediate the issue(s).

Therefore, there exists a need for a fault management tool that can provide accurate and reliable fault detection and vendor attribution on a tenant network. There is also a strong need to provide a fault management tool with cloud-based restricted access control for vendor triage and fault remediation operations on the tenant network.

The present technology includes systems, methods, and computer-readable media for solving these problems and discrepancies.

OVERVIEW

Disclosed are systems, apparatuses, methods, and computer-readable media for providing cloud-based, dynamically restricted fault triage access in a tenant network. In some embodiments, the tenant network can be a private and/or enterprise fifth-generation (5G) network environment. In some embodiments, dynamically restricted fault triage access can be provided based on a role-based access control (RBAC) scheme created in the tenant network. For example, in response to detection of a vendor-specific problem within the tenant network, a time-bound user account can be dynamically created and mapped to the detected fault, associated with the RBAC scheme, and provided to a third-party vendor associated with the detected vendor-specific problem. The dynamically created time-bound user account can subsequently be used to provide the third-party vendor with selectively restricted access to the tenant network. In some examples, the selectively restricted access to the tenant network is minimally permissive only to the extent needed to triage and/or remediate the detected vendor-specific problem.

DESCRIPTION

The disclosure turns now to FIG. 1, which depicts an example fault management system diagram and process flow 100 for providing dynamically restricted fault triage access to vendor components that are experiencing fault events in a tenant network 105, in accordance with some aspects of the present disclosure. As illustrated in FIG. 1, a network management and control system 110 is communicatively provided between tenant network 105 and a vendor operational support system/business support system (OSS/BSS) 150. In some embodiments, the tenant network 105 can be a private and/or enterprise 5G network. In some examples, tenant network 105 can be wholly or partially implemented using one or more 5G functional elements and/or management services that are provided by different third parties (e.g., different vendors). Although not illustrated for the sake of simplicity and clarity of explanation, it is appreciated that tenant network 105 can include a plurality of individual components, functional elements and/or network elements, etc. One or more constituent components of tenant network 105 can be provided in a physical or on-premises form, can be provided in a cloud-based or remote form, or can be provided via some combination of the two.

In an illustrative example, tenant network 105 includes a 5G RAN that is constructed from one or more network components and/or functions that are obtained from third-party vendors. Network management system 110 can then be configured to provide fault detection, fault reporting, and fault triaging services to a third-party vendor, who is provided access to network management system 110 (and therefore restricted access to tenant network 105) via the vendor OSS/BSS 150—as will be explained in greater depth below. It is noted that this example is provided for purposes of illustration and is not intended to be construed as limiting. For example, in some embodiments tenant network 105 could additionally (or alternatively) include a 5G core that is constructed from one or more network components and/or functions obtained from third-party vendors, in which case network management system 110 can be configured to provide the same or similar fault detection, reporting, and triaging services to the corresponding third-party vendors.

With respect to tenant network 105, in some embodiments the tenant network 105 can be wholly or partially implemented under a 5G-as-a-service model. In a 5G-as-a-service model, one or more portions of a 5G network environment (e.g., such as tenant network 105) can be assembled by obtaining various 5G functional elements and/or 5G functions from selected third-party vendors. Customization and convenience can make the 5G-as-a-service model an attractive option within the enterprise space. In some examples, the 5G-as-a-service model can be applied to each portion of a 5G network environment, e.g., the entire tenant network 105 can be built by selecting from a variety of third-party vendor components and elements. The 5G-as-a-service model can also be applied to the construction of only a subset or selected portion of the 5G network environment, rather than to the entirety of the 5G network. For example, in some embodiments, only the 5G core network and/or the 5G radio access network (RAN) of tenant network 105 might be assembled from third-party vendor components.

Many private 5G deployments (e.g., such as tenant network 105) utilize on-premises and/or cloud components obtained from multiple different third-party vendors for at least the 5G RAN. The 5G RAN is a complex and distributed system that is based on a functional split architecture that includes an RU (Radio Unit), a CU (Centralized Unit), and a DU (Distributed Unit). This split architecture can, in at least some cases, provide a basis for integrating different third-party vendor components, e.g., RU obtained from a first vendor, CU obtained from a second vendor, DU obtained from a third vendor, etc., although it is noted that different combinations and splits can be utilized without departing from the scope of the present disclosure. Independent of the particular third-party vendor selection scheme that is utilized, it is contemplated that the RU, CU, and/or DU can be mixed and matched from different vendors in constructing the 5G RAN of tenant network 105.

As mentioned previously, cloud-based management is often used in association with various 5G-as-a-service deployment models, including in association with multiple third-party vendor components. However, when a customer (e.g., the enterprise or tenant associated with a private 5G network) encounters a problem or issue in one or more of the third-party components of the network, existing solutions do not provide a mechanism that enables the third-party vendor to access the network in a more secured manner to triage the issue, and instead often rely on a manual access provisioning approach and/or a blanket access approach in which the third-party vendor is given access to the network without restriction.

In some embodiments, the network management and control system 110 depicted in FIG. 1 can be provided as a cloud-based network management and control system that addresses the problem(s) of providing third-party vendors with secure and/or restricted access to the tenant network 105, e.g., for purposes of fault triage and remediation. In particular, the network management system 110 can provide dynamically restricted fault triage access to vendor components that are experiencing fault events in tenant network 105, as will be described in greater depth below.

It is noted that the constituent components that are depicted in FIG. 1 for network management system 110 can be combined and/or sub-divided without departing from the scope of the present disclosure. Additionally, it is noted that one or more of the constituent components of network management system 110 can be collocated with one another, can be located remote from one another, or both.

As illustrated, network management system 110 includes a vendor fault detection service (VFDS) 120, a vendor fault reporting service (VFRS) 130, and a vendor fault triaging service (VFTS) 140. Each of these three vendor-related services will be discussed in greater depth below. Network management system 110 can further include one or more components that support the functionality and operation of the vendor-related services 120,130,140. For example, as illustrated, network management system 110 can include: a telemetry collector 160, which obtains telemetry information and/or event signaling from tenant network 105 and subsequently provides VFDS 120 with telemetry inputs; a database 170, which can support various I/O operations from the vendor-related services 120-140; and a communication proxy service 180, which communicatively couples VFTS 140 to tenant network 105.

In some embodiments, network management system 110 can be configured with a user account in association with the tenant network 105, e.g., an account that allows the tenant to login to or otherwise access the network management system 110 in order to control and manage their tenant network 105. As mentioned previously, the network management system 110 can be cloud-based, in which case the tenant (or other operator/administrator) of tenant network 105 can remotely login or access the network management system 1110, e.g., via the internet or other communication network(s).

In some examples, a tenant or administrator associated with tenant network 105 can provide one or more user inputs to network management system 110 indicative of a user consent or preference selection for the dynamic enablement of restricted access to tenant network 105 by third-party RAN vendors, e.g., for purposes of fault triage and remediation. Such a user input can be provided as a global permission, e.g., once provided to network management system 110, the permission remains active until canceled or modified. In some examples, such a user input can be provided on a case-by-case basis, e.g., approval or permission is requested each time before a third-party vendor is provided with restricted access to tenant network 105. In some instances, user permission or approval might be requested the first time that a third-party vendor is to be provided with restricted access to tenant network 105, with a given third-party vendor being automatically granted permission for any subsequent access after the initial approval.

As mentioned previously, FIG. 1 depicts network management system 110 as being communicatively coupled between the tenant network 105 and a vendor operational support system/business support system (OSS/BSS) 150. In some embodiments, the vendor OSS/BSS 150 can be registered with the network management system 110 in order to provide one or more third-party vendors with the presently disclosed restricted access to tenant network 105. Although not depicted, in some embodiments database 170 can store vendor registration information and/or other registration information for configuring the vendor OSS/BSS 150 with access to network management system 110. With respect to FIG. 1, a single vendor OSS/BSS 150 is illustrated. It is appreciated that in some cases, the single vendor OSS/BSS 150 can serve multiple different third-party vendors or otherwise enable multiple different third-party vendors to obtain restricted access to tenant network 105. In some examples, a 1:1 ratio can be utilized wherein the vendor OSS/BSS 150 is associated with only a single third-party vendor that will be given restricted access to tenant network 105, e.g., with additional vendor OSS/BSS systems (not shown) provided for each additional vendor that will be given restricted access to tenant network 105 via network management system 110.

The disclosure turns now to the example process flow 100 that is presented in FIG. 1. Eleven different steps are identified via numerals contained within a circle, although it is appreciated a greater or less number of steps and/or different ordering(s) and/or combinations of the illustrated example steps can be utilized without departing from the scope of the present disclosure. Connecting lines with arrows indicate the entities, components, services, etc., that may be involved in a given step, although it is appreciated that different components can be utilized for various steps without departing from the scope of the present disclosure. It is additionally noted that process flow 100 is illustrated with steps 1-11 for purposes of clarity of explanation, e.g., the steps can be performed in a different order than is illustrated in FIG. 1, and/or multiple steps can be performed concurrently, without departing from the scope of the present disclosure.

Step (1): A telemetry collector 160 obtains or otherwise collects telemetry information and/or event signaling from tenant network 105. The telemetry collection can be performed in a push or pull fashion with respect to telemetry collector 160. In some embodiments, telemetry data can be obtained at a pre-determined polling frequency or in accordance with a pre-determined refresh schedule or scheme. In some examples, telemetry data can be streamed to or collected by telemetry collector 160 in substantially real-time. In some cases, telemetry data can be sent in chunks or blocks once a pre-determined size threshold has been reached. It is also contemplated that in some embodiments, telemetry collector 160 can perform independent telemetry collection on a per-vendor basis, a per-device basis, a per-network component basis, etc. For example, telemetry collector 160 can obtain telemetry data from the 5G RAN of tenant network 105, from one or more devices in the transport layer, from the 5G packet core, etc. Once telemetry data has been collected at telemetry collector 160, the telemetry data can be processed for output to VFDS 120 (as described below with respect to step 2).

In some embodiments, telemetry collector 160 can obtain telemetry data in a standardized format. For example, one or more third-party vendors participating in tenant network 105 can provide telemetry data in a standardized format, e.g., as given according to the 5G specification. Telemetry collector 160 can also obtain telemetry data in a non-conforming or non-standardized format, in which case one or more pre-processing operations can be performed by telemetry collector 160 in order to convert non-conforming data into a conforming format or a format expected by VFDS 120. For example, a conforming or standardized telemetry data format might include an error code or a generated error indication, along with an indicator of the network component/location that generated or is associated with the telemetry data or error code. In a scenario in which non-conforming telemetry data is received at telemetry collector 160, telemetry collector 160 can process and analyze the non-conforming telemetry data locally to generate one or more corresponding error codes in accordance with the expected standardized telemetry data format. Non-conforming telemetry data can include raw sensor, log, and/or event data, etc. Non-conforming telemetry data can also include telemetry data generated according to a different standard or format, e.g., tenant network 105 might include one or more third-party vendor components or proprietary systems that utilize proprietary telemetry reporting.

Step (2): Telemetry collector 160 obtains or receives telemetry data from tenant network 105 and provides the vendor fault detection service (VFDS) 120 with telemetry data. In some embodiments, VFDS 120 can consume the same telemetry data that was collected by telemetry collector 160, e.g., telemetry collector 160 does not modify or change the collected telemetry data received from tenant network 105. In some examples, telemetry collector 160 can perform one or more pre-processing operations before transmitting processed telemetry data to VFDS 120. For example, telemetry collector 160 can perform pre-processing operations to organize, clean, label or re-label, etc., the received telemetry data from tenant 105 such that the pre-processed telemetry data can subsequently be processed more efficiently by VFDS 120.

Step (3) and Step (4): Vendor Fault Detection Service (VFDS) 120 receives telemetry data from telemetry collector 160 and processes the received telemetry data. When VFDS 120 identifies a fault event, VFDS 120 can determine or identifying a vendor to associate with the fault event (e.g., a vendor responsible for a faulty component, or a vendor that provided a component determined to have caused the identified fault event). In some embodiments, a fault event can be associated with a vendor identification to form a vendor fault event. In some embodiments, a vendor problem can be detected directly, in which case VFDS 120 can generate a vendor fault event (e.g., step 4) with a gleaned vendor fault context (e.g., step 3). In some embodiments, the vendor fault event and vendor fault context can be generated concurrently, generated as a single/combined data structure, etc. In some examples, VFDS 120 can generate the vendor fault context first, with the corresponding vendor fault event generated subsequently and associated with the vendor fault context. In some examples, VFDS 120 can generate the vendor fault event first, with a corresponding vendor fault context generated subsequently and associated to the existing vendor fault event. As such, the vendor fault event and vendor fault context generated by VFDS 120 are both discussed below.

VFDS 120 can receive and process telemetry data to identify any potential fault scenarios in or across the tenant network 105. In some examples, VFDS 120 can process the received telemetry data to identify potential fault scenarios that are related to one or more third-party vendors within the tenant network 105. The detection of a fault scenario and the identification of an associated or responsible third-party vendor can be performed in a single step and/or can be performed in multiple steps, as will be explained below.

The telemetry data received by VFDS 120 (and therefore, the telemetry data output by telemetry collector 160) can include fault events, key performance indicators (KPIs), etc., as has been described previously. In some embodiments, VFDS 120 can identify potential fault scenarios by co-relating the received telemetry data. The analytical process of co-relating the received telemetry data can be performed in order to trace the actual, underlying origin or root cause of an error or anomaly, e.g., an anomaly in system A is not necessarily indicative that the anomaly originated in system A.

As such, in some embodiments, VFDS 120 can be configured to first analyze the received telemetry data to detect any problems within tenant network 105. In response to detecting one or more problems, VFDS 120 can then perform a secondary analysis of the received telemetry data and/or the previously detected problem in order to determine a specific third-party vendor that caused the problem in tenant network 105. In some examples, the secondary analysis can identify a particular network device (and/or component, function, etc.) that caused the problem in tenant network 105, at which point the third-party vendor associated with the identified network device can be ascertained. In other words, the identification of a network fault can be distinct from identifying the vendor/vendor component responsible for the fault for at least the reason that the manifestation of a fault is often separate and distinct from the source of the fault. For example, a vendor fault scenario can occur when a vendor device/function is itself experiencing a fault or error. However, a vendor fault scenario can also occur when a vendor device/function is not itself experiencing a fault or error but is causing a fault or error at a different location within tenant network 105, e.g., because the vendor device/function is misconfigured, etc.

In some embodiments, VFDS 120 can be provided as a processing pipeline that ingests telemetry data from telemetry collector 160 and analyzes (e.g., co-relates) the ingested telemetry data along a processing path of the pipeline. The processing path of the pipeline can be configured to identify vendor-specific problems. The identification of vendor-specific problems can be performed based on telemetry data obtained from the 5G RAN of tenant network 105 (e.g., O-RAN telemetry data) and/or can be performed based on telemetry data obtained from one or more third-party vendors with network devices or functions contained in the 5G RAN of tenant network 105. After identifying a vendor-specific problem, the processing pipeline of VFDS 120 can generate a vendor fault event and a vendor fault context for each vendor-specific problem that is identified.

A vendor fault context contains information that pertains to a specific underlying problem that was identified by VFDS 120. In some cases, the vendor fault context includes only information that is determined to be necessary for the identified third-party vendor to triage and remediate the problem within tenant network 105. Limiting the information content provided in the vendor fault context can additionally help ensure that personally identifiable information (PII) is not leaked or distributed through the vendor fault context that is generated by VFDS 120 and utilized by network management system 110 as a whole. In some embodiments, VFDS 120 can generate a vendor fault context to include one or more of: an O-RAN fault code; a RAN fault code; a proprietary or vendor-specific fault code; a gNB (gNodeB) ID where an issue was reported or detected; RU, DU, and/or CU information based on the underlying fault; a severity of the issue based on the criticality of one or more UEs (user equipment); a topology of the system (e.g., tenant network 105), with non-vendor specific information masked or hidden; a location of vendor logs captured; etc.

A vendor fault event is used to trigger the dynamic generation of a restricted access account to tenant network 105, e.g., for purposes of allowing the third-party vendor to access only the portions of tenant network 105 as needed to fix any problems caused by or occurring in that specific vendor's network components/functions.

In some examples, one vendor fault context can be generated for each identified vendor-specific problem, e.g., in a 1:1 ratio. In some embodiments, a single vendor fault event can be associated with multiple vendor fault contexts. For example, if a given vendor has multiple network components/functions in the 5G RAN of tenant network 105, it is possible for that vendor to experience multiple simultaneous faults or errors (or nearly simultaneous/highly concurrent multiple faults). VFDS 120 can generate an individual fault context for each of the simultaneous vendor faults. However, rather than generating a separate fault event for each fault context, VFDS 120 can instead generate only a single vendor fault event and associate the single vendor fault event with each of the fault contexts. In this manner, a single dynamic user account with restricted access to tenant network 105 can subsequently be generated and provided to the given vendor, such that the vendor can access tenant network 105 in a single session to triage and remediate all of the faulty components that were identified for that vendor.

As illustrated in FIG. 1, the vendor fault context(s) generated by VFDS 120 can be output to a database 170, e.g., which can store the vendor fault events for subsequent access by other components of the network management system 110. The vendor fault event(s) generated by VFDS 120 can be output to a vendor fault reporting service (VFRS) 130, as will be described below.

Step (5): Vendor Fault Reporting Service (VFRS) 130 can additionally generate a fault meta file, which can be stored in database 170 as illustrated in FIG. 1. In some embodiments, the fault meta file contains or otherwise indicates the particular data that are allowed to be exposed to a vendor or other third-party for purposes of triaging or remediating a fault in tenant network 105. The fault meta file can later be used by a Vendor Fault Triaging Service (VFTS) 140 in creating a restricted access view into the tenant network 105, as will be explained in greater depth below (e.g., with respect to steps 8-10). In some embodiments, the restricted access view provided to a vendor or other third-party can contain (or otherwise permit access to) only the data, information, network locations and components, etc., that are contained within the fault meta file, or otherwise indicated by the fault meta file. As illustrated in FIG. 1, the fault meta file can be generated by VFRS 130 and persisted in database 170. In some embodiments, the fault meta file can be generated by VFRS 130 and shared with or otherwise provided to the VFTS 140 directly.

For example, the fault meta file can contain some or all of the information contained in the vendor fault context (e.g., the vendor fault context described previously with respect to step 3). In some embodiments, the fault meta file can contain a reproduction of the information in the fault meta file. Additionally, or alternatively, the fault meta file can contain one or more pointers or references to portions of the information in the fault meta file, e.g., pointers or references to information that was previously written to database 170 in step 3. The fault meta file can also contain telemetry data and/or other data that is determined to be necessary to debug the identified vendor-specific problem—as will be explained in greater depth below, the fault context information and debugging data that are contained in the fault meta file can be used to create a corresponding restricted access view of tenant network 105 that will be provided to the vendor to triage and remediate the identified vendor-specific problem.

Step (6): Vendor Fault Reporting Service (VFRS) 130 receives at least a vendor fault event from VFDS 120, as illustrated in FIG. 1. VFRS 130 consumes the fault event and creates a dynamic user account that will form the basis of the third-party vendor's dynamically restricted access to tenant network 105. In some embodiments, the vendor fault event provided to VFRS 130 by VFDS 120 can include a reference or database identifier for the vendor fault context that is associated with the vendor fault event. In some embodiments, the vendor fault event can itself contain some or all of the vendor fault context information stored in database 170.

In an illustrative example, VFRS 130 can generate a dynamic, time-bound user account for a particular vendor (or other third-party needing restricted access to tenant network 105). The dynamic, time-bound user account can be generated based at least in part on a unique RBAC (role-based access control) scheme, indicated in FIG. 1 as 'Vendor-Admin RBAC'. The Vendor-Admin RBAC scheme can be pre-defined for or otherwise existing within the network management system 110. In particular, the Vendor-Admin RBAC scheme can be defined for the tenant's context in network management system 110 (e.g., the context created in network management system 110 for providing cloud-based management of tenant network 105).

The Vendor-Admin RBAC scheme can be statically defined and utilized to provide multiple different vendors and/or third parties with dynamically restricted access to tenant network 105, e.g., the same Vendor-Admin RBAC scheme can be used to provide different third-party vendors with different degrees of restricted access. In some embodiments, the Vendor-Admin RBAC scheme can be statically defined and have zero associated users in a default case/status, e.g., a user account is only associated to the Vendor-Admin RBAC scheme when a vendor-specific problem is identified in tenant network 105 and restricted third-party access is needed. In such a scenario, the detection of a vendor-specific problem by VFDS 120, and more particularly the receipt of a corresponding vendor fault event at VFRS 130, can trigger the dynamic creation of a time-bound user account for the specific vendor.

The time-bound user account for the specific vendor is then mapped to the corresponding vendor fault context and is associated with the Vendor-Admin RBAC scheme. In some embodiments, VFRS 130 can dynamically create the time-bound account for a specific vendor as determined from the vendor fault event received at VFRS 130. Additionally, VFRS 130 can perform the mapping between the time-bound user account and the corresponding vendor fault context based at least in part on the received vendor fault event. For example, the received vendor fault event can contain some or all of the corresponding vendor fault context (as discussed previously). In some examples, the received vendor fault event can contain a pointer, reference, identifier, etc., that allows VFRS 130 to retrieve or otherwise obtain the appropriate corresponding vendor fault context from database 170.

As mentioned above, in some embodiments the Vendor-Admin RBAC scheme can be statically defined. Subsequently, users/user accounts can be dynamically created and associated with a specific fault context. For example, different vendor fault events can each have a different fault context (e.g., specific to a particular underlying problem) attached. The vendor fault context can determine the particular views or level of access in tenant network 105 that will be exposed to the vendor, and therefore, the vendor fault context can be used to perform dynamic access restriction with any degree of desired granularity across different vendors, network component/function type, network location, etc.

After dynamically creating the time-bound account for a specific vendor (and associating the time-bound account with both the vendor fault context and the Vendor-Admin RBAC scheme), VFRS 130 can report the identified issue to the identified third-party vendor, along with the required access information for the third-party vendor to triage and remediate the issue in tenant network 105. For example, VFRS 130 can output a reporting message that contains time-bound access information for the newly created time-bound account and a unique URL. The unique URL can point to Vendor Fault Triaging Service (VFTS) 140, which provides the dynamically restricted third-party access to tenant network 105 in response to receiving an input of the appropriate credentials (e.g., the time-bound access info/ login information of the time-bound account provided to the vendor).

Steps (7) and (8): Time-bound access information (e.g., login credentials) and a URL can be transmitted to the vendor OSS/BS 150 from VFRS 130. In some embodiments, the transmission of the access information and the URL can itself comprise vendor fault reporting. In some embodiments, VFRS 130 can additionally provide summary and/or context information in addition to the time-bound access information and URL illustrated in FIG. 1, e.g., in a single reporting email or other text-based communication. In some examples, each third-party vendor participating in tenant network 105 can register their vendor OSS/BSS with the network management system 110 in advance, thereby permitting VFRS 130 to proactively trigger the appropriate vendor OSS/BSS 150 with dynamically generated user access information whenever a vendor-specific problem is identified in tenant network 105.

In some embodiments, the URL generated by VFRS 130 can point to a Vendor Fault Triaging Service (VFTS) 140. The VFTS 140 can receive as input the time-bound access information from the vendor OSS/BSS 150 (e.g., step (7)). In response to validating the time-bound access information, VFTS 140 can in response provide the vendor OSS/BSS with a restricted access vendor view into tenant network 105 (e.g., step (8)). The restricted access vendor view can provide only the level of access as is needed for the vendor to triage and remediate their vendor-specific problem in tenant network 105, as described previously. For example, the restricted access vendor view provided by VFTS 140 can correspond to the restrictions imposed based on the vendor fault context generated by VFDS 120 and/or the time-bound user account generated by VFRS 130, both of which are described above.

Step (9): The VFTS (Vendor Fault Triaging Service) 140 can access or retrieve the fault meta file (e.g., generated as described in step 5) and create a corresponding restricted access view into tenant network 105 based on the fault meta file. For example, VFTS 140 can retrieve the fault meta file as stored in database 170, and subsequently use some or all of the retrieved fault meta file to generate the restricted access view for a given vendor and/or identified vendor-specific problem. In some examples, the restricted access view for the given vendor can include all of the information contained in or indicated by the fault meta file. In some cases, the restricted access view created for the given vendor can include a subset of the information contained in or indicated by the fault meta file. In some embodiments, although not shown in FIG. 1, VFTS 140 can receive the fault meta file as input from VFRS 130 directly, rather than pulling the fault meta file from database 170.

As mentioned previously, the fault meta file can be generated to include at least a portion of the fault context and any data determined to be necessary to debug and/or remediate an underlying issue that was detected in tenant network 105 and determined to be caused by a component that was provided by or associated with the given third-party vendor. The data included in or indicated by the fault meta file can be selected or obtained from the telemetry data collected at telemetry collector 160. The fault meta file can also include data generated by VFDS 120, e.g., generated in the process of analyzing telemetry data to identify or detect the specific network issue for which the fault meta file was created. In some embodiments, the fault meta file can include one or more tools or other means to debug the underlying issue in tenant network 105.

After retrieving the fault meta file, VFTS 140 can subsequently use the retrieved fault meta file to create or otherwise configure the restricted access view into tenant network 105, e.g., the restricted access view that is provided in response to a vendor login at VFTS 140. In some embodiments, the fault meta file can be exposed to the vendor (e.g., exposed to vendor OSS/BSS 150) only via VFTS 140, e.g., as a part of the restricted access vendor view that is provided by network management system 110/VFTS 140.

Step (10) and Step (11): After logging in to the VFTS 140, a restricted access view can be presented to the vendor. In some examples, the restricted access view is the same as the restricted vendor view transmitted from VFTS 140 to vendor OSS/BSS 150, e.g., as described previously with respect to step (8). Upon logging in to the VFTS 140, the one or more identified faults associated with the given third-party vendor can be displayed or highlighted. Using fault context information from the fault meta file (e.g., as described above in steps 5 and/or 9), VFTS 140 can display only the relevant portions of the tenant network 105, thereby restricting access to any portions of the network that are unrelated to the triage and remediation of the vendor-specific problem.

In some embodiments, the VFTS 140 presents an isolated view for the vendor or other third party that is generated based on the vendor fault context, such that the isolated view restricts the vendor to accessing (e.g., viewing) only the information that is contained in the fault context. In such a scenario, the isolated view generated and presented by VFTS 140 can additionally (or alternatively) permit the vendor to interact only with network devices, components, functions, etc., that were previously identified or indicated in one or more of the vendor fault event, the vendor fault context, and/or the fault meta file that have been described above.

As illustrated, a communication proxy service 180 can be included in the network management system 110. In particular, the communication proxy service 180 can be communicatively coupled between VFTS 140 and the tenant network 105. In some examples, the communication proxy service 180 can include a DxHub framework. In some embodiments, the communication proxy service 180 can provide an additional layer of access restriction by preventing vendors and other third parties from communicating or otherwise interacting directly with the tenant network 105. By routing communication and interaction through communication proxy service 180, the vendor triage and error remediation processes can, in some examples, be limited to the execution of read-only comments and/or one or more APIs (Application Programming Interfaces) on the given vendor's hardware that is part of tenant network 105. In some embodiments the communicative link between communication proxy service 180 and tenant network 105 can be configured such that information fetching from tenant network 105 is performed in a read-only manner. In some cases, read-only access to tenant network 105 can be limited to vendor devices, hardware, functions, etc., located within the tenant network 105, thereby preventing vendors and third parties from exploring other portions of the network in an inappropriate manner (e.g., beyond what is needed to triage and remediate a fault in that vendor's device/hardware).

Figure 2:
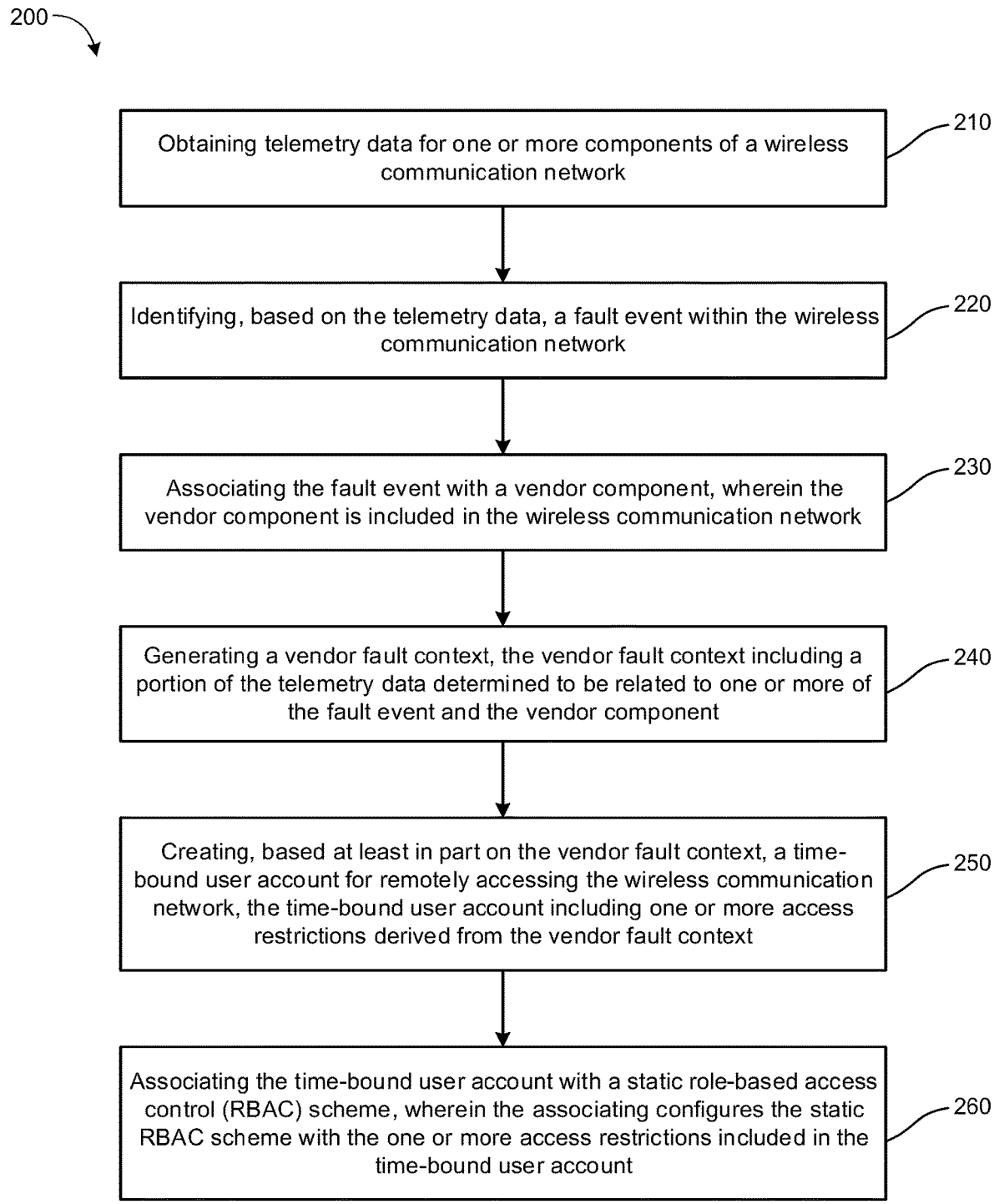
FIG. 2 illustrates an example method for dynamically providing restricted network access for fault management, according to some aspects of the present disclosure.

FIG. 2 illustrates a flowchart of an example method 200 for dynamically providing restricted network access for fault management, in accordance with some embodiments of the present disclosure. Although method 200 depicts a particular sequence of operations, the sequence may be altered without departing from the scope of the present disclosure. For example, some of the operations depicted may be performed in parallel or in a different sequence that does not materially affect the function of method 200. In other examples, different components of an example device or system that implements method 200 may perform functions at substantially the same time or in a specific sequence.

According to some embodiments, method 200 includes obtaining telemetry data for one or more components of a wireless communication network at step 210. For example, telemetry collector 160 illustrated in FIG. 1 can obtain or otherwise collect telemetry information and/or event signaling. In some examples, the telemetry data can be obtained for one or more components of a wireless communication network such as the tenant network 105, also illustrated in FIG. 1. The telemetry collection can be performed in a push or pull fashion. Telemetry data can be obtained in real-time (or substantially real-time) and/or in a periodic fashion, without departing from the scope of the present disclosure. In some embodiments, telemetry data can be obtained at a pre-determined polling frequency or in accordance with a pre-determined refresh schedule or scheme. In some cases, telemetry data can be sent in chunks or blocks once a pre-determined size threshold has been reached. It is also contemplated that in some embodiments, telemetry data can be obtained on a per-vendor basis, a per-device basis, a per-network component basis, etc. For example, telemetry data can be obtained from a 5G RAN (e.g., associated with the tenant network 105 illustrated in FIG. 1), can be obtained from one or more devices in a transport layer, can be obtained from a 5G packet core, etc. In some embodiments, telemetry data can be obtained in a standardized format. For example, one or more third-party vendors participating in tenant network 105 can provide telemetry data in a standardized format, e.g., as according to the 5G specification. In some embodiments, telemetry data can be obtained in a non-conforming or non-standardized format, in which case one or more pre-processing operations can be performed (e.g., by telemetry collector 160 illustrated in FIG. 1) in order to convert non-conforming data into a conforming format or an expected format for downstream operations.

According to some embodiments, method 200 includes identifying, based on the telemetry data, a fault event within the wireless communication network at step 220. For example, vendor fault detection service (VFDS) 120 illustrated in FIG. 1 can analyze or otherwise consume the telemetry data to identify one or more fault events. In some examples, the telemetry data can be used to identify potential fault scenarios that are related to one or more third-party vendors within a wireless communication network such as the tenant network 105 illustrated in FIG. 1. The detection of a fault scenario and the identification of an associated or responsible third-party vendor can be performed in a single step and/or can be performed in multiple steps. The telemetry data used to identify a fault event within the network can include fault events directly contained within or reported in the telemetry data, key performance indicators (KPIs), vendor-specific telemetry data, standardized telemetry data, etc. In some embodiments, VFDS 120, as illustrated in FIG. 1, can identify potential fault scenarios by co-relating the received telemetry data. The analytical process of co-relating the received telemetry data can be performed in order to trace the actual, underlying origin or root cause of an error or anomaly, e.g., an anomaly in system A is not necessarily indicative that the anomaly originated in system A.

According to some embodiments, method 200 includes associating the fault event with a vendor component, wherein the vendor component is included in the wireless network at step 230. For example, VFDS 120 illustrated in FIG. 1 can associate the fault event with a vendor component that is included in the wireless tenant network 105. In some embodiments, fault events can be associated with a vendor component via one or more of a vendor fault event and a vendor fault context, both of which are illustrated in FIG. 1. In some embodiments, associating the fault event with a vendor component can be a secondary analysis performed after a primary analysis that identifies the fault event itself (e.g., as in step 220). In some examples, the fault event can be associated with a vendor component based on the same telemetry data used to detect the underlying fault event itself. For example, associating the fault event with a vendor component can include identifying a particular network device (and/or component, function, etc.) in tenant network 105 (illustrated in FIG. 1) that caused the problem in tenant network 105, at which point the third-party vendor associated with the identified network device can be ascertained. In other words, the identification of a network fault can be distinct from identifying the vendor/vendor component responsible for the fault for at least the reason that the manifestation of a fault is often separate and distinct from the source of the fault. In some embodiments, the fault event can be associated with a vendor component using a processing pipeline that is associated with the VFDS 120 illustrated in FIG. 1, e.g., wherein VFDS 120 analyzes (e.g., co-relates) the telemetry data along a processing path of the pipeline. The processing path of the pipeline can be configured to identify vendor-specific problems based on telemetry data obtained from the 5G RAN of tenant network 105 (e.g., O-RAN telemetry data) and/or can be performed based on telemetry data obtained from one or more third-party vendors with network devices or functions contained in the 5G RAN of tenant network 105 illustrated in FIG. 1.

According to some embodiments, method 200 includes generating a vendor fault context including a portion of the telemetry data determined to be related to one or more of the fault event and the vendor component at step 240. For example, after identifying a vendor-specific problem at step 230, the VFDS 120 illustrated in FIG. 1 can generate a vendor fault event and a vendor fault context for each vendor-specific problem that is identified. In some examples, the generated vendor fault context can be stored in a database 170, illustrated in FIG. 1. In some embodiments, a vendor fault context can be generated to contain information pertaining to a specific underlying problem that was identified by VFDS 120. In some cases, the vendor fault context includes only information that is determined to be necessary for the identified third-party vendor to triage and remediate the problem within the tenant network 105 illustrated in FIG. 1. Limiting the information content provided in the vendor fault context can additionally help ensure that personally identifiable information (PII) is not leaked or distributed through the generated vendor fault context. In some embodiments, the generated vendor fault context can include one or more of: an O-RAN fault code; a RAN fault code; a proprietary or vendor-specific fault code; a gNB (gNodeB) ID where an issue was reported or detected; RU, DU, and/or CU information based on the underlying fault; a severity of the issue based on the criticality of one or more UEs (user equipment); a topology of the system (e.g., the tenant network 105 illustrated in FIG. 1), with non-vendor specific information masked or hidden; a location of vendor logs captured; etc.

According to some embodiments, method 200 includes creating, based at least in part on the vendor fault context, a time-bound user account for remotely accessing the wireless communication network, the time-bound user account including one or more access restrictions derived from the vendor fault context, at step 250. For example, the Vendor Fault Reporting Service (VFRS) 130 illustrated in FIG. 1 can create the time-bound user account for remotely accessing the wireless communication network, based at least in part on the vendor fault context discussed above. In some embodiments, the vendor fault context can be obtained from the vendor fault event and then used to create the time-bound user account, e.g., VFRS 130 of FIG. 1 can receive and consume the vendor fault event in order to obtain the vendor fault context to create the time-bound user account. In some embodiments, the time-bound user account can be a dynamically created user account that will form the basis of the third-party vendor's dynamically restricted access to the tenant network 105 illustrated in FIG. 1. The one or more access restrictions can b derived from the vendor fault context, such that the isolated view restricts the vendor to accessing (e.g., viewing) only the information that is contained in the vendor fault context. In such a scenario, an isolated or restricted view can be generated based on (or including) the one or more access restrictions derived from the vendor fault context. In some examples, the one or more access restrictions can permit the vendor to interact only with network devices, components, functions, etc., that were previously identified or indicated in one or more of the vendor fault event, the vendor fault context, and/or a fault meta file as have been described previously.

According to some embodiments, method 200 includes associating the time-bound user account with a static role-based access control (RBAC) scheme, wherein the associating configures the static RBAC scheme with the one or more access restrictions include in the time-bound user account, at step 260. For example, the VFRS 130 illustrated in FIG. 1 can associate the time-bound user account with the Vendor-Admin RBAC scheme that is also illustrated in FIG. 1. In some examples, the static RBAC scheme (e.g., such as the Vendor-Admin RBAC scheme) can be pre-defined. In some examples, the static/Vendor-Admin RBAC scheme can be defined for the tenant's context in the network management system 110 illustrated in FIG. 1 (e.g., the context created in network management system 110 for providing cloud-based management of tenant network 105). The Vendor-Admin RBAC scheme can be statically defined and utilized to provide multiple different vendors and/or third parties with dynamically restricted access to the tenant network 105 illustrated in FIG. 1, e.g., the same Vendor-Admin RBAC scheme can be used to provide different third-party vendors with different degrees of restricted access. In some embodiments, the Vendor-Admin RBAC scheme can be statically defined and have zero associated users in a default case/status, e.g., a user account is only associated to the Vendor-Admin RBAC scheme when a vendor-specific problem is identified in tenant network 105 and restricted third-party access is needed. As mentioned above, in some embodiments the Vendor-Admin RBAC scheme can be statically defined. Subsequently, users/user accounts can be dynamically created and associated with a specific fault context. For example, different vendor fault events can each have a different fault context (e.g., specific to a particular underlying problem) attached. The vendor fault context can determine the particular views or level of access in tenant network 105 that will be exposed to the vendor, and therefore, the vendor fault context can be used to perform dynamic access restriction with any degree of desired granularity across different vendors, network component/function type, network location, etc.

Figure 3:
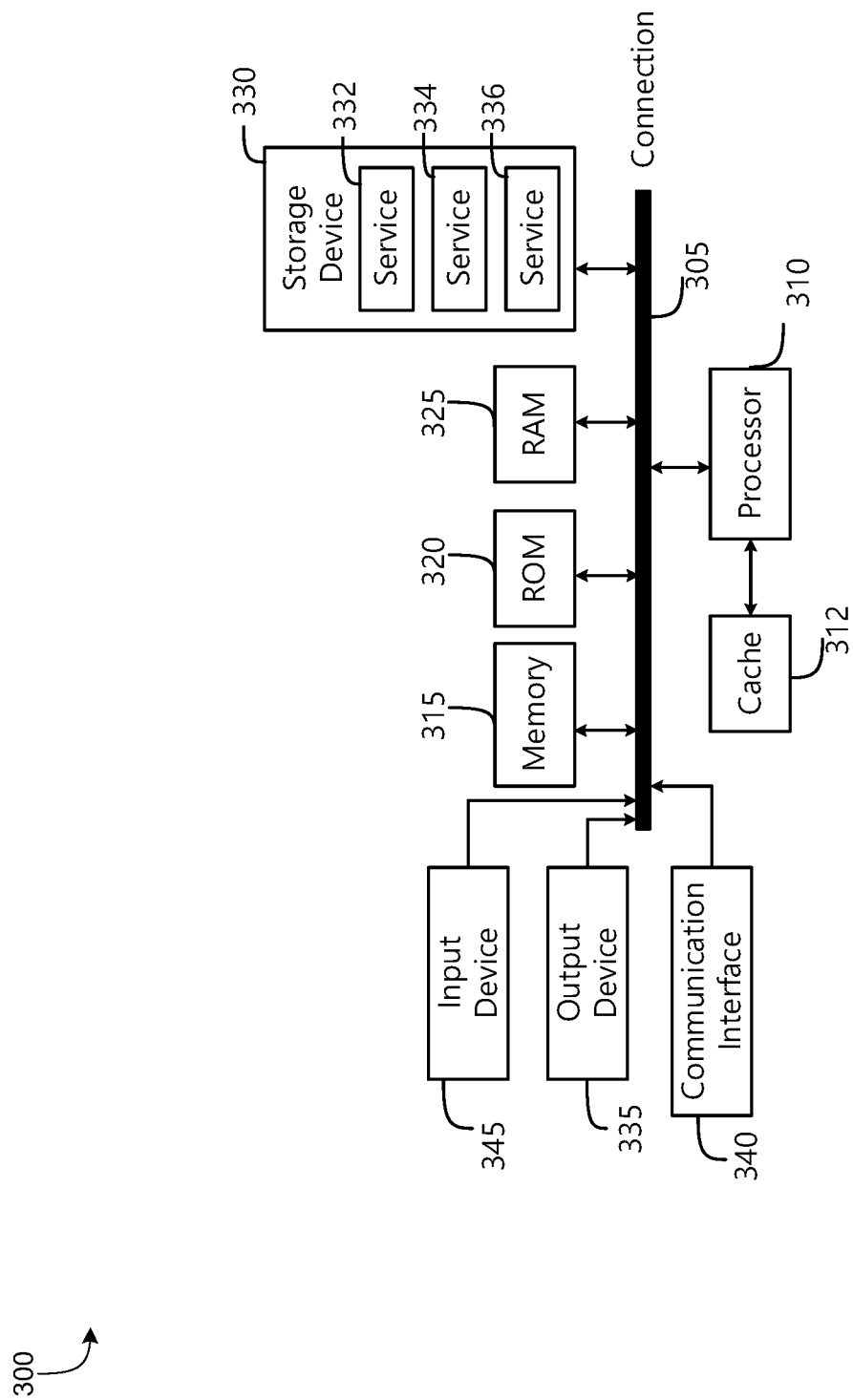
FIG. 3 illustrates an example system for implementing certain aspects of the present technology, in accordance with some embodiments of the present disclosure.

FIG. 3 shows an example of computing system 300, which can be, for example, any computing device making up network management system 110, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read-only memory (ROM) 320 and random-access memory (RAM) 325 to processor 310. Computing system 300 can include a cache of high-speed memory 312 connected directly with, in close proximity to, or integrated as part of processor 310.

Processor 310 can include any general-purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   obtaining telemetry data for one or more components of a wireless communication network;
   identifying, based on the telemetry data, a fault event within the wireless communication network;
   associating the fault event with a vendor component, wherein the vendor component is included in the wireless communication network;
   generating a vendor fault context, the vendor fault context including a portion of the telemetry data determined to be related to one or more of the fault event and the vendor component;
   creating, based at least in part on the vendor fault context, a time-bound user account for remotely accessing the wireless communication network, the time-bound user account including one or more access restrictions derived from the vendor fault context; and
   associating the time-bound user account with a static role-based access control (RBAC) scheme, wherein the associating configures the static RBAC scheme with the one or more access restrictions included in the time-bound user account.

2. The method of claim 1, wherein the vendor component associated with the fault event is located in a 5G Radio Access Network (RAN) of the wireless communication network.

3. The method of claim 1, wherein:
   the wireless communication network is a private 5G cellular network and includes a tenant context for an operator of the private 5G cellular network; and
   the static RBAC scheme is defined in the tenant context of the private 5G cellular network.

4. The method of claim 1, wherein:
   the wireless communication network includes a 5G Radio Access Network (RAN), the 5G RAN comprising at least a Radio Unit (RU), a Distributed Unit (DU), and a Central Unit (CU); and
   the one or more components for which the telemetry data is obtained include at least one of the RU, the DU, and the CU of the 5G RAN.

5. The method of claim 1, wherein creating the time-bound user account includes generating a time-bound login credential and a dynamic link to an interface for remotely accessing the wireless communication network.

6. The method of claim 5, further comprising:
generating a fault report, the fault report including at least the time-bound login credential and the dynamic link; and
transmitting the fault report to a user, without transmitting the vendor fault context or any telemetry data.

7. The method of claim 6, wherein:
the user is a vendor associated with the vendor component; and
and the fault report is transmitted to an operations support system (OSS) or business support system (BSS) registered to the vendor.

8. The method of claim 5, further comprising:
receiving, via the dynamic link, a user input including the time-bound login credential;
validating the time-bound login credential; and
in response to the validating, providing a restricted access view of the fault event within the wireless communication network.

9. The method of claim 1, wherein the vendor fault context includes one or more of: a RAN fault code, a proprietary fault code, a network topology with non-vendor specific information masked, and a location of one or more captured vendor log files.

10. A system for fault management with dynamic restricted access, the system comprising:
one or more processors;
at least one computer-readable storage medium having instructions stored thereon, wherein the instructions, when executed by the one or more processors, are effective to cause the one or more processors to:
obtain telemetry data for one or more components of a wireless communication network;
identify, based on the telemetry data, a fault event within the wireless communication network;
associate the fault event with a vendor component, wherein the vendor component is included in the wireless communication network;
generate a vendor fault context, the vendor fault context including a portion of the telemetry data determined to be related to one or more of the fault event and the vendor component;
create, based at least in part on the vendor fault context, a time-bound user account for remotely accessing the wireless communication network, the time-bound user account including one or more access restrictions derived from the vendor fault context; and
associate the time-bound user account with a static role-based access control (RBAC) scheme, wherein the associating configures the static RBAC scheme with the one or more access restrictions included in the time-bound user account.

11. The system of claim 10, wherein the vendor component associated with the fault event is located in a 5G Radio Access Network (RAN) of the wireless communication network.

12. The system of claim 10, wherein:
the wireless communication network is a private 5G cellular network and includes a tenant context for an operator of the private 5G cellular network; and
the static RBAC scheme is defined in the tenant context of the private 5G cellular network.

13. The system of claim 10, wherein:
the wireless communication network includes a 5G Radio Access Network (RAN), the 5G RAN comprising at least a Radio Unit (RU), a Distributed Unit (DU), and a Central Unit (CU); and
the one or more components for which the telemetry data is obtained include at least one of the RU, the DU, and the CU of the 5G RAN.

14. The system of claim 10, wherein the instructions cause the one or more processors to create the time-bound user account by generating a time-bound login credential and a dynamic link to an interface for remotely accessing the wireless communication network.

15. The system of claim 14, wherein the instructions, when executed by the one or more processors, are further effective to cause the one or more processors to:
generate a fault report, the fault report including at least the time-bound login credential and the dynamic link; and
transmit the fault report to a user, without transmitting the vendor fault context or any telemetry data;
wherein the user is a vendor associated with the vendor component and the fault report is transmitted to an operations support system (OSS) or business support system (BSS) registered to the vendor.

16. A non-transitory computer-readable storage medium having instructions stored thereon, wherein the instructions, when executed by a processor, are effective to cause the processor to:
obtain telemetry data for one or more components of a wireless communication network;
identify, based on the telemetry data, a fault event within the wireless communication network;
associate the fault event with a vendor component, wherein the vendor component is included in the wireless communication network;
generate a vendor fault context, the vendor fault context including a portion of the telemetry data determined to be related to one or more of the fault event and the vendor component;
create, based at least in part on the vendor fault context, a time-bound user account for remotely accessing the wireless communication network, the time-bound user account including one or more access restrictions derived from the vendor fault context; and
associate the time-bound user account with a static role-based access control (RBAC) scheme, wherein the associating configures the static RBAC scheme with the one or more access restrictions included in the time-bound user account.

17. The non-transitory computer-readable storage medium of claim 16, wherein:
the vendor component associated with the fault event is located in a 5G Radio Access Network (RAN) of the wireless communication network;
the wireless communication network is a private 5G cellular network and includes a tenant context for an operator of the private 5G cellular network; and
the static RBAC scheme is defined in the tenant context of the private 5G cellular network.

18. The non-transitory computer-readable storage medium of claim 16, wherein:
the wireless communication network includes a 5G Radio Access Network (RAN), the 5G RAN comprising at least a Radio Unit (RU), a Distributed Unit (DU), and a Central Unit (CU); and
the one or more components for which the telemetry data is obtained include at least one of the RU, the DU, and the CU of the 5G RAN.

19. The non-transitory computer-readable storage medium of claim 16, wherein the instructions, when executed by the processor, are effective to cause the processor to create the time-bound user account by generating a time-bound login credential and a dynamic link to an interface for remotely accessing the wireless communication network.

20. The non-transitory computer-readable storage medium of claim 19, wherein the instructions, when executed by the processor, are further effective to cause the processor to:
generate a fault report, the fault report including at least the time-bound login credential and the dynamic link; and
transmit the fault report to a user, without transmitting the vendor fault context or any telemetry data;
wherein the user is a vendor associated with the vendor component and the fault report is transmitted to an operations support system (OSS) or business support system (BSS) registered to the vendor.

* * * * *